(12) United States Patent
Hsu et al.

(10) Patent No.: US 10,554,058 B2
(45) Date of Patent: Feb. 4, 2020

(54) SYSTEMS AND METHODS FOR MONITORING AN OPERATING STATUS OF A CONNECTOR

(71) Applicant: MediaTek Inc., Hsin-Chu (TW)

(72) Inventors: Chih-Yuan Hsu, Hsinchu (TW); Chi-Ming Lee, Hsinchu (TW); Shih-Ming Chen, Hsin-Chu (TW)

(73) Assignee: Media Tek Inc., Hsin-Chu (TW)

( * ) Notice: Subject to any disclaimer, the term of this patent is extended or adjusted under 35 U.S.C. 154(b) by 26 days.

(21) Appl. No.: 16/024,538

(22) Filed: Jun. 29, 2018

(65) Prior Publication Data

US 2018/0331548 A1 Nov. 15, 2018

Related U.S. Application Data

(63) Continuation-in-part of application No. 15/006,129, filed on Jan. 26, 2016, now Pat. No. 10,181,742.

(60) Provisional application No. 62/539,582, filed on Aug. 1, 2017, provisional application No. 62/539,581, filed on Aug. 1, 2017, provisional application No. 62/161,880, filed on May 14, 2015.

(51) Int. Cl.
*H02J 7/00* (2006.01)

(52) U.S. Cl.
CPC ............ *H02J 7/0042* (2013.01); *H02J 7/007* (2013.01)

(58) Field of Classification Search
CPC ........ H02J 7/0042; H02J 7/007; H02J 7/0036; H02J 7/008
USPC ....................................................... 320/162
See application file for complete search history.

(56) References Cited

U.S. PATENT DOCUMENTS

| 5,416,470 A | * | 5/1995 | Tanaka | ................... | G01R 27/26 324/133 |
| 5,661,463 A | * | 8/1997 | Letchak | ............. | G01R 31/3648 340/636.15 |
| 6,049,475 A | * | 4/2000 | Azuma | ................. | H02M 7/538 363/132 |

(Continued)

FOREIGN PATENT DOCUMENTS

| CN | 2877107 Y | 3/2007 |
| CN | 102231549 A | 11/2011 |
| CN | 103187769 A | 7/2013 |

OTHER PUBLICATIONS

U.S. Appl. No. 15/006,129, filed Jan. 26, 2016, Hsu et al.
U.S. Appl. No. 16/214,150, filed Dec. 10, 2018, Hsu et al.

*Primary Examiner* — M Baye Diao
(74) *Attorney, Agent, or Firm* — Wolf, Greenfield & Sacks, P.C.

(57) ABSTRACT

According to at least one aspect, a device is provided. The device comprises: a connector configured to electrically couple to an external device and comprising a plurality of terminals including a supply terminal; a monitoring circuit coupled to the supply terminal and configured to apply an electrical signal to the supply terminal and measure at least one of a voltage level and a current level on the supply terminal; a controller communicatively coupled to the monitoring circuit and configured to: determine whether an impedance between the supply terminal and at least one other terminal in the plurality of terminals is above a threshold using the at least one of the voltage level and the current level on the supply terminal; and output at least one message responsive to the impedance being below the threshold.

25 Claims, 4 Drawing Sheets

(56) References Cited

U.S. PATENT DOCUMENTS

| | | | | |
|---|---|---|---|---|
| 6,128,169 | A * | 10/2000 | Neiger | G01R 31/12 324/520 |
| 6,618,648 | B1 * | 9/2003 | Shirota | G01R 31/088 700/286 |
| 7,652,578 | B2 * | 1/2010 | Braun | G06K 19/0717 235/451 |
| 8,990,036 | B1 * | 3/2015 | Schweitzer, III | G01R 31/088 702/58 |
| 9,078,308 | B2 * | 7/2015 | Williams | H05B 37/0245 |
| 9,363,871 | B2 * | 6/2016 | Williams | H02J 9/065 |
| 10,181,742 | B2 | 1/2019 | Hsu et al. | |
| 10,382,312 | B2 * | 8/2019 | Dalal | |
| 2007/0136025 | A1 | 6/2007 | Lo et al. | |
| 2010/0201308 | A1 | 8/2010 | Lindholm | |
| 2011/0018522 | A1 | 1/2011 | Li et al. | |
| 2011/0025262 | A1 | 2/2011 | Fischer et al. | |
| 2011/0181104 | A1 | 7/2011 | Kamaga | |
| 2012/0119696 | A1 | 5/2012 | Picard | |
| 2012/0153993 | A1 | 6/2012 | Xie et al. | |
| 2013/0082644 | A1 | 4/2013 | Gagne et al. | |
| 2013/0154547 | A1 | 6/2013 | Wada et al. | |
| 2013/0181675 | A1 | 7/2013 | Kawasaki et al. | |
| 2013/0249279 | A1 * | 9/2013 | Sogabe | B60R 16/03 307/9.1 |
| 2013/0271107 | A1 | 10/2013 | Grossier et al. | |
| 2014/0015476 | A1 | 1/2014 | Kondo | |
| 2015/0048804 | A1 | 2/2015 | Toivanen et al. | |
| 2015/0346252 | A1 * | 12/2015 | Forrest | G01R 27/02 324/719 |
| 2016/0098688 | A1 | 4/2016 | Hunt et al. | |
| 2016/0336761 | A1 | 11/2016 | Hsu et al. | |
| 2019/0097681 | A1 * | 3/2019 | Honda | H04B 3/42 |
| 2019/0109480 | A1 | 4/2019 | Hsu et al. | |
| 2019/0187202 | A1 * | 6/2019 | Schweitzer, III | G01R 31/088 |

* cited by examiner

SYSTEMS AND METHODS FOR MONITORING AN OPERATING STATUS OF A CONNECTOR

CROSS REFERENCE TO RELATED APPLICATIONS

This application is a non-provisional of U.S. Provisional Application Ser. No. 62/539,581 titled "DETECTING METHOD FOR DETECTING ABNORMAL STATUS OF CONNECTOR OF ELECTRONIC DEVICE (USB PPS)," filed Aug. 1, 2017, and U.S. Provisional Application Ser. No. 62/539,582 titled "DETECTING METHOD FOR DETECTING ABNORMAL STATUS OF CONNECTOR OF ELECTRONIC DEVICE," filed Aug. 1, 2017, each of which is hereby incorporated herein by reference in its entirety. This application is also a continuation-in-part of U.S. patent application Ser. No. 15/006,129 titled "ELECTRONIC DEVICE, CHARGER WITHIN THE ELECTRONIC DEVICE, AND DETECTING METHOD FOR DETECTING ABNORMAL STATUS OF CONNECTOR OF ELECTRONIC DEVICE," filed Jan. 26, 2016, which is a non-provisional of U.S. Provisional Application No. 62/161,880 titled "FOREIGN OBJECT DETECTION AND PROTECTION FOR CHARGING SYSTEM," filed May 14, 2015, each of which is incorporated herein by reference in its entirety.

BACKGROUND

1. Technical Field

The techniques described herein relate to techniques for monitoring an operating status of a connector in, for example, an electronic device.

2. Discussion of the Related Art

Connectors are commonly used to enable communication and/or power transfer between different devices. For example, a connector in an electronic device may be electrically coupled to another connector in a charger by a cable to enable the charger to provide power to the electronic device. These electrical connectors typically comprise a plurality of terminals that each removably coupled to a conductor in the cable. Example connectors include: UNIVERSAL SERIAL BUS (USB) connectors such as USB Type A connectors, USB Type B connectors, USB Type C connectors; FIREWIRE connectors; and THUNDERBOLT connectors.

SUMMARY

According to at least one aspect, a device is provided. The device comprises: a connector configured to electrically couple to an external device and comprising a plurality of terminals including a supply terminal; a monitoring circuit coupled to the supply terminal and configured to apply an electrical signal to the supply terminal and measure at least one of a voltage level and a current level on the supply terminal; a controller communicatively coupled to the monitoring circuit and configured to: apply, via the monitoring circuit, the electrical signal to the supply terminal; identify, via the monitoring circuit, the at least one of the voltage level and the current level on the supply terminal while the electrical signal is applied to the supply terminal; determine whether the impedance between the supply terminal and at least one other terminal in the plurality of terminals is above a threshold using the at least one of the voltage level and the current level on the supply terminal; and output at least one first message responsive to the impedance being below the threshold.

In some embodiments, the device further comprises a battery and a charger circuit coupled between the supply terminal and the battery and configured to selectively charge the battery using at least some power from the supply terminal.

In some embodiments, the controller is configured to control the charging circuit to charge the battery using the at least some power from the supply terminal responsive to the impedance being above the threshold.

In some embodiments, the controller is configured to determine whether the impedance is above the threshold at least in part by determining whether the at least one of the voltage level and the current level on the supply terminal is within a range of acceptable values.

In some embodiments, the controller is configured to apply the electrical signal to the supply terminal and identify the at least one of the voltage level and the current level on the supply terminal while the external device is not providing power to the supply terminal.

In some embodiments, the controller is configured to, before applying the electrical signal to the supply terminal, transmit at least one control signal to the external device to stop providing power to the supply terminal responsive to detecting the connection to the external device.

In some embodiments, the controller is configured to apply the electrical signal to the supply terminal and identify the at least one of the voltage level and the current level on the supply terminal during a debounce period where the external device is not providing power to the supply terminal after the connector is electrically coupled to the external device.

In some embodiments, the monitoring circuit is configured to apply the electrical signal to the supply terminal and measure the at least one of the voltage level and the current level on the supply terminal at least in part by applying a voltage to the supply terminal and measuring the current level on the supply terminal.

In some embodiments, the monitoring circuit comprises a voltage source coupled to the supply terminal and a current detector coupled to the supply terminal and the voltage source.

In some embodiments, the monitoring circuit is configured to apply the electrical signal to the supply terminal and measure the at least one of the voltage level and the current level on the supply terminal at least in part by applying a current to the supply terminal and measuring the voltage level on the supply terminal.

In some embodiments, the monitoring circuit comprises a current source coupled to the supply terminal and a voltage detector coupled to the supply terminal and the voltage source.

In some embodiments, the connector comprises a communication terminal coupled to the communication circuit, the communication circuit is configured to communicate with the external device via the communication terminal, and the controller is configured to detect, via the communication circuit, a connection to the external device and apply the electrical signal to the supply terminal responsive to detecting the connection to the external device.

In some embodiments, the communication circuit comprises a resistance coupled between the communication terminal and a reference potential and wherein the controller is configured to detect the connection to the external device based on a voltage level on the communication terminal.

According to at least one aspect, a device is provided. The device comprises a connector configured to electrically couple to an external device and comprising a plurality of terminals including a supply terminal; a communication circuit configured to communicate with the external device; a monitoring circuit coupled to the supply terminal and configured to measure a current level on the supply terminal; a controller communicatively coupled to the communication circuit and the monitoring circuit, the controller being configured to: identify, via the monitoring circuit, the current level on the supply terminal; obtain, via the communication circuit, a current level output by the external device; determine whether an impedance between the supply terminal and at least one other terminal in the plurality of terminals is above a threshold using the current level on the supply terminal and the current level output by the external device; and output at least one message responsive to the impedance being below the threshold.

In some embodiments, the device further comprises a battery and a charger circuit coupled between the supply terminal and the battery and configured to selectively charge the battery using at least some power from the supply terminal.

In some embodiments, the controller is configured to control the charging circuit to charge the battery using the at least some power from the supply terminal responsive to the impedance being above the threshold.

In some embodiments, the controller is configured to determine whether the impedance is above the threshold at least in part by determining whether a difference between the current level on the supply terminal and the current level output by the external device is below a threshold value.

In some embodiments, the controller is configured identify the current level on the supply terminal and obtain a current level output by the external device while the external device is providing power to the supply terminal.

In some embodiments, the controller is configured to output the at least one message at least in part by transmitting a message to the external device to stop providing power to the supply terminal.

In some embodiments, the connector comprises a communication terminal coupled to the communication circuit, the communication circuit is configured to communicate with the external device via the communication terminal, and the controller is configured to detect, via the communication circuit, a connection to the external device and identify the current level on the supply terminal responsive to detecting the connection to the external device.

In some embodiments, the communication circuit comprises a resistance coupled between the communication terminal and a reference potential and wherein the controller is configured to detect the connection to the external device based on a voltage level on the communication terminal.

According to at least one aspect, a device is provided. The device comprises: a connector configured to electrically couple to an external device and comprising a plurality of terminals including a supply terminal and a communication terminal; a communication circuit coupled to the communication terminal and configured to communicate with the external device via the communication terminal; a power source configured to provide output power; a power control circuit coupled between the power source and the supply terminal and configured to selectively couple the power source to the supply terminal and measure a current level on the supply terminal; a controller coupled to the communication circuit and the power control circuit, the controller being configured to: detect, via the communication circuit, a connection to the external device; couple, via the power control circuit, the power source to the supply terminal responsive to detecting the connection to the external device; receive, via the communication circuit, a current level request from the external device; and responsive to receiving the current level request, identify, via the power control circuit, the current level on the supply terminal; and transmit, via the communication circuit, the current level on the supply terminal to the external device.

In some embodiments, the communication circuit comprises at least one of a current source and an impedance coupled to the communication terminal and wherein the controller is configured to detect the connection to the external device based on a voltage level on the communication terminal.

In some embodiments, the controller is configured to receive a stop request to stop providing power to the supply terminal from the external device and, responsive to receipt of the stop request, control the power control circuit to decouple the power source from the supply terminal.

According to at least one aspect, a system is provided. The system comprises: a first device including a first connector configured to electrically couple to a second device and comprising a first supply terminal, a first communication circuit configured to communicate with the second device, a circuit coupled to the first supply terminal and configured to measure a current level on the first supply terminal, and a first controller coupled to the circuit and the first communication circuit, the first controller being configured to receive, via the first communication circuit, a current level request from the second device, and responsive to receiving the current level request, identify, via the circuit, the current level on the first supply terminal and transmit, via the communication circuit, the current level on the first supply terminal to the second device; and the second device including a second connector configured to electrically couple to the first device and comprising a second supply terminal, a second communication circuit configured to communicate with the first device, a monitoring circuit coupled to the second supply terminal and configured to measure a current level on the second supply terminal, a second controller communicatively coupled to the second communication circuit and the monitoring circuit, the second controller being configured to identify, via the monitoring circuit, the current level on the second supply terminal, obtain, via the second communication circuit, the current level on the first supply terminal from the first device, determine whether an impedance between the supply terminal and at least one other terminal in the plurality of terminals is above a threshold using the current level on the first supply terminal and the current level on the second supply terminal, and output at least one message responsive to the impedance being below the threshold.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
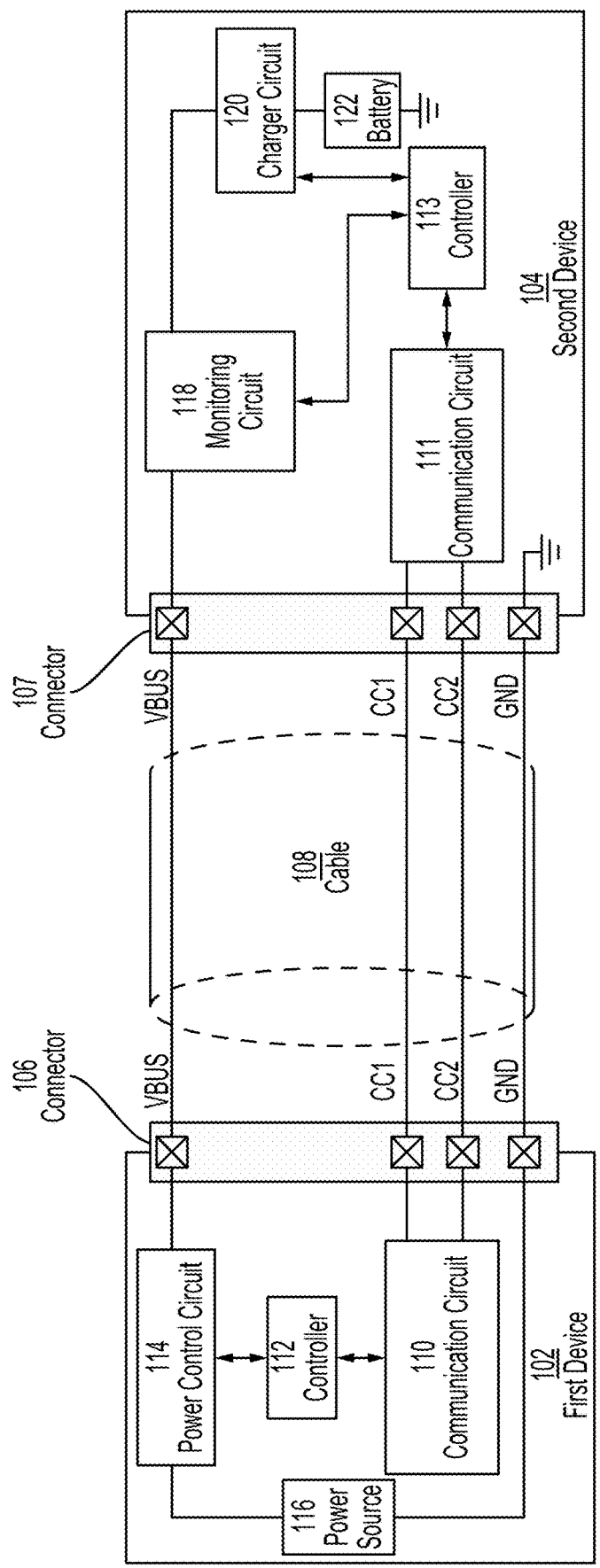
FIG. 1 shows a diagram of an example system configured to monitor an operating status of a connector, according to some embodiments.

As mentioned above, connectors are commonly used to electrically couple multiple devices via a cable. The inventors have appreciated that these connectors may malfunction and cause considerable damage to the connector itself and/or the device in which the connector is integrated. The inventors have appreciated that a connector may malfunction when a leakage current is permitted between two or more terminals in the connector. During normal operation, the impedance between the terminals within a connector should be sufficiently high such that there is little or no leakage current between terminals in the connector. The high impedance between the terminals in a connector may be created by having the terminals physically separated within the connector and disposing an insulative material between the terminals. However, sometimes the impedance between two terminals may break down and, thus, allow a leakage current between two terminals. This breakdown in impedance may be caused by, for example, damage to the connector, foreign material(s) shorting the terminals (e.g., dust, metal scraps, liquid), and/or damage to the cable connected to the connector. For example, a damaged cable may be inserted into the connector that has a short between two conductors that are each coupled to a respective terminal in the connector. In this example, the damaged cable may permit a leakage current between the two terminals in the connector.

Accordingly, aspects of the present disclosure relate to new techniques to monitor the status of a connector to determine whether the connector is in a normal operating state or an abnormal operating state. These new techniques may, for example, monitor (directly or indirectly) an impedance between at least two terminals in the connector. If the impedance between the at least two terminals in the connector is above the threshold, the connector is in a normal operating state and power transfer via the connector may be safely performed. If the impedance between the at least two terminals in the connector falls below a threshold, the connector is in an abnormal operating state and power transfer via the connector should be stopped. Thus, any potential damage that may be caused by the malfunctioning connector may be mitigated and/or avoided entirely.

The impedance between the terminals in the connector may be (directly or indirectly) monitored in any of a variety of ways. In some embodiments, the impedance between the at least two terminals may be determined by applying an electrical signal to one of the terminals and measuring at least one of a voltage level and a current level on the same terminal. The known characteristics of the electrical signal applied to the terminal in combination with the measured at least one of a voltage level and a current level on the same terminal may be employed to determine the impedance between the at least two terminals. For example, a known voltage (e.g., a supply voltage) may be applied to the terminal while the terminal is floating (e.g., the terminal is not being driven by another source) and the current level on the terminal may be measured while the known voltage is applied. In this example, the measured current level on the terminal may be approximately (or exactly) equal to the leakage current between the terminal and another terminal in the connector. Thus, the impedance between the terminals may be calculated by dividing the known voltage by the measured current level on the terminal. Further, the measured current level is correlated (e.g., negatively correlated) to the impedance between the terminals (e.g., the impedance is high when the measured current level is low). In another example, a known current may be applied to the terminal while the terminal is floating and a voltage level on the terminal may be measured while the known current is applied to the terminal. Thus, the impedance between the terminals may be calculated by dividing the measured voltage level on the terminal by the known current. Further, the measured voltage level is correlated (e.g., positively correlated) to the impedance between the terminals (e.g., the impedance is high when the measured voltage level is high).

In some embodiments, the impedance between at least two terminals may be determined using at least some information from the external device electrically coupled to the connector. In these embodiments, a current level output by the external device may be compared with a current level received by the connector. Given Kirchhoff's current law (e.g., the sum of all currents entering a node should equal the sum of all currents leaving the node), any difference between the current level output by the external device and the current level received by the connector is likely attributable to a leakage current. Thus, the connector is in a normal operating state when the current level output by the external device is equal (or approximately equal) to the current level received by the connector and the connector is in an abnormal operating state when the current level output by the external device substantially deviates from the current level received by the connector.

The aspects and embodiments described above, as well as additional aspects and embodiments, are described further below. These aspects and/or embodiments may be used individually, all together, or in any combination of two or more, as the application is not limited in this respect.

FIG. 1 shows an example system 100 that is configured to monitor an operating status of a connector. As shown, the system 100 comprises a first device 102 and a second device 104 that each comprise a connector (shown as connectors 106 and 107, respectively) that removably engage a cable 108. The first device 102 may be configured to provide power to the second device 104 from a power source 116 via the connectors 106 and 107 and the cable 108. For example, the first device 102 may be implemented as a charger (e.g., a USB charger) that receives power from an electrical outlet and converts the power into a format suitable for charging the second device 104. The second device 104 may be configured to use the power provided from the first device 102 to power one or more internal components. For example, the second device 104 may be implemented as an electronic device (e.g., a mobile phone, a tablet, a pair of headphones, a speaker, a game console, and a digital camera) that employs at least some of the power received from the first device 102 to charge a battery 122. The second device 104 may, in some embodiments, monitor a status of the connector 107 to mitigate (or eliminate) the possibility of the first device 102 and/or the second device 104 being damaged during the power transfer. For example, the second device 104 (alone or in concert with the first device 102) may (directly or indirectly) monitor the impedance between the supply terminal in the connector 107 and at least one other terminal in the connector 107. If the impedance is below a threshold, the second device 104 may send a message to the first device 102 to stop providing power to the second device 104. Otherwise, the first device 102 may be permitted to provide power to the second device 104 uninterrupted.

The connectors 106 and 107 in the first and second devices 102 and 104, respectively, may each be configured to electrically coupled together by the cable 108. The connectors 106 and 107 may function as, for example, an interface between first and second devices 102 and 104, respectively, and the cable 106. The connectors 106 and 107 may each comprise a plurality of terminals that each electrically couple to at least one conductor within the cable 108. The connectors 106 and 107 may be configured to enable power transmission and/or communication between the first and second devices 102 and 104, respectively. As shown, the connectors 106 and 107 each comprise a plurality of terminals including a supply terminal (VBUS) and a reference terminal (GND) for power transfer in addition to a first communication terminal (CC1) and a second communication terminal (CC2) for communication. It should be appreciated that the construction of the connectors 106 and 107 may vary based on the particular implementation. For example, the connectors 106 and 107 may comprise additional (or fewer) communication terminals than is shown in FIG. 1. Further, the construction of the connector 106 may be different from the construction of the connector 107. For example, the connector 107 may comprise additional (or fewer) terminals than the connector 106.

The first device 102 may comprise the power source 116 that is configured to provide output power suitable for transfer to the second device 104 over the connector 106. For example, the power source 116 may output direct current (DC) power such as low-voltage DC power. Low-voltage DC power may be, for example, DC power with a voltage level that is below a threshold value (e.g., 100 Volts, 50 Volts, 25 Volts, 10 Volts, 5 Volts, etc.). The power source 116 may be configured to generate power and/or receive power from an external source. For example, the power source 116 may comprise a power generation unit (e.g., a solar panel) and a power conversion circuit configured to convert the output power of the power generation unit into a format suitable to provide to the second device 104. In another example, the power source 116 may be configured to receive alternating current (AC) power from an external source (e.g., an outlet) and convert the AC power into DC power to provide to the second device 104. Thus, the power source 116 may comprise any of a variety of power generating device and/or power conversion circuitry (e.g., DC-DC converters, AC-AC converters, DC-AC converters, and/or AC-DC converters).

The first device 102 may comprise a power control circuit 114 configured to selectively couple the power source 116 to the connector 106 (e.g., the supply terminal in the connector 106). The power control circuit 114 may, for example, selectively couple the power source 116 to the connector 106 based on a control signal (e.g., received from the controller 112). For example, the power control circuit 114 may comprise one or more switches (e.g., implemented using one or more transistors) coupled between the power source 116 and the connector 106 that are turned on or off based on the control signal. The power control circuit 114 may, in some embodiments, additionally comprise circuitry to monitor a characteristic of the power output by the first device 102, such as the voltage level and/or current level output on the supply terminal of the connector 106. In these embodiments, the information regarding the characteristic of the power output by the power source 116 may be provided to the controller 112 (e.g., for transmission to the second device 104).

The first device 102 may further comprise a communication circuit 110 that is configured to enable communication with the second device 104. The communication circuit 110 may communicate with the second device 104 using wireless communication techniques or wired communication techniques (e.g., via the first and second communication terminals in the connector 106). The communication circuit 110 may be configured to enable bi-directional communication (e.g., communication from the first device 102 to the second device 104 and from the second device 104 to the first device 102) or unidirectional communication (e.g., communication either only from the first device 102 to the second device 104 or from the second device 104 to the first device 102). It should be appreciated that the particular implementation of the communication circuit 110 may vary based on, for example, the particular communication method employed for communication between the first and second devices 102 and 104, respectively.

The first device 102 may comprise a controller 112 that is configured to control one or more other components within the first device 102. For example, the controller 112 may be communicatively coupled to and configured to control the power control circuit 114 and/or the communication circuit 110. The controller 112 may be implemented as, for example, a microprocessor or other suitable circuitry. The controller 112 may control the components within the first device 102 to enable power transfer to the second device 104. The particular operations performed by the controller 112 to enable power transfer to the second device 104 may depend on the particular construction of the first device 102. In some embodiments, the controller 112 may be configured to detect, via the communication circuit 110, a connection to the second device 104 by, for example, detecting a change in the voltage on one or more of the communication terminals in the connector 106. In these embodiments, the controller 112 may couple the power source 116 to the supply terminal of the connector 106 responsive to detecting the connection to the second device 104 to initiate power transfer to the second device 104. The controller 112 may control the power control circuit 114 to keep the power source 116 coupled to the supply terminal of the connector 106 unless a stop request is received from the second device 104 (e.g., via the communication circuit 110). Once a stop request is received, the controller 110 may direct the power control circuit 114 to decouple the power source 116 from the supply terminal of the connector 106.

The second device 104 may comprise a charger circuit 120 that is configured to charge the battery 122. The charger circuit 120 may, for example, employ power received from the first device 102 (e.g., via the supply terminal of the connector 106) to charge the battery 122. The charger circuit 120 may charge the battery 122 based on the control signal received from the controller 112. For example, the charger circuit 120 may start (or stop) charging the battery 122 based on a received control signal from the controller 112. The battery 122 may be, for example, a rechargeable battery such as a lithium ion battery. It should be appreciated that the particular implementation of the charger circuit 120 and/or the battery 122 may vary based on the particular implementation.

The second device 104 may further comprise a communication circuit 111 that is configured to enable communication with the first device 102. The communication circuit 111 may communicate with the first device 102 using wireless communication techniques or wired communication techniques (e.g., via the first and second communication terminals in the connector 106). The communication circuit 111 may be configured to enable bi-directional communication (e.g., communication from the first device 102 to the second device 104 and from the second device 104 to the first device 102) or unidirectional communication (e.g., communication either only from the first device 102 to the second device 104 or from the second device 104 to the first device 102). It should be appreciated that the particular implementation of the communication circuit 111 may vary based on, for example, the particular communication method employed for communication between the first and second devices 102 and 104, respectively. Further, the construction of the communication circuit 111 in the second device 104 may be different from (or the same as) the construction of the communication circuit 110 in the first device 102.

The second device 104 may comprise a monitoring circuit 118 that is coupled between the supply terminal of the connector 107 and the charger circuit 120. The monitoring circuit 118 may be configured to monitor one or more parameters that may be employed by a controller 113 in the second device 104 to determine whether the connector 107 is in a normal operating state or an abnormal operating state. For example, the monitoring circuit 118 may be configured to measure a current level on the supply terminal of the connector 107, measure a voltage level on the supply terminal of the connector 107, and/or apply an electrical signal to the supply terminal of the connector 107. It should be appreciated that the particular construction of the monitoring circuit 118 may depend on, for example, the particular techniques employed by the second device 104 to monitor a state of the connector 107.

The second device 104 may comprise a controller 113 configured to control one or more other components within the second device 104 to enable monitoring of a state of the connector 107. For example, the controller 113 may be communicatively coupled to and configured to control the communication circuit 111, the monitoring circuit 118, and the charger circuit 120. The controller 113 may be implemented as, for example, a microprocessor or other suitable circuitry. The controller 113 may be configured to control the internal components of the second device 104 to enable monitoring of a state of the connector 107 by, for example, obtaining one or more current and/or voltage levels on the supply terminal of the connectors 106 and/or 107 and compare the obtained one or more current and/or voltage levels with a set of one or more acceptable ranges. If the obtained one or more current and/or voltage levels are outside the acceptable range, the connector 106 is in a normal operating state and the controller 113 may permit power transfer from the first device 102 to the second device 104 (and/or instruct the charger circuit 120 to use the received power to charger the battery 122). Otherwise, the connector 106 is in an abnormal state and the controller 113 may interrupt the power transfer from the first device 102 to the second device 104 (and/or instruct the charger circuit 120 to stop charging the battery 122). For example, the controller 113 may transmit, via the communication circuit 111, a stop request to the first device 102 to trigger the first device 102 to stop transferring power (e.g., opening a switch in the power control circuit 114 to decouple the power source 116 from the supply terminal of the connector 106). Additionally (or alternatively), the controller 113 may output a message to a human user of the second device 104 using an output device, such as a display, a speaker, etc., indicative of the malfunction.

Figure 2A:
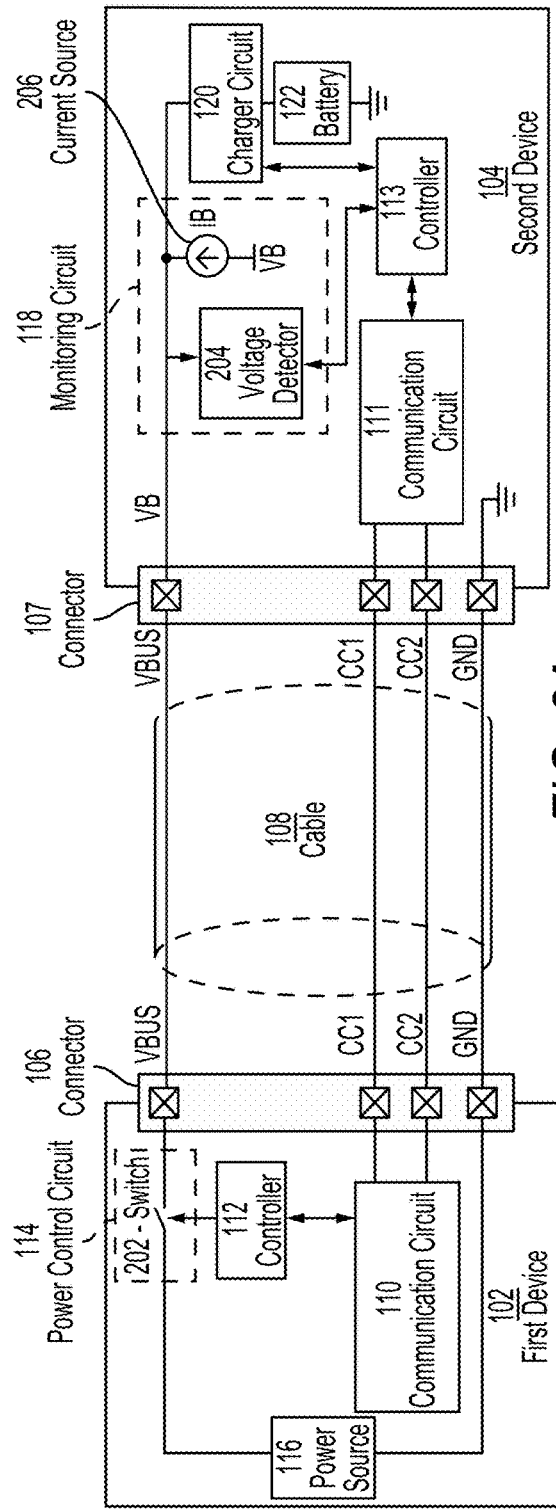
FIGS. 2A and 2B each shows an example implementation of the system shown in FIG. 1 configured to monitor an operating status of a connector, according to some embodiments.

In some embodiments, the second device 104 may monitor a status of the connector 107 at least in part by applying an electrical signal to the supply terminal of the connector 107 while the supply terminal is left floating (e.g., a switch in the power control circuit 114 is open to decouple the power source 116 from the supply terminal of the connector 106) and measuring at least one of a voltage level and a current level on the supply terminal of the connector 107 while the electrical signal is applied. The known characteristics of the electrical signal applied to the supply terminal in combination the measured at least one of a voltage level and a current level on the supply terminal may be employed to determine the impedance between the supply terminal and another terminal of the connector 107. For example, a known current may be applied to the terminal while the terminal is floating and a voltage level on the terminal may be measured while the known current is applied to the terminal. In this example, the impedance between the supply terminal and at least one other terminal of the connector 107 may be calculated by dividing the measured voltage level on the terminal by the known current. Thus, the measured voltage level is positively correlated to the impedance (e.g., the impedance is high when the measured voltage level is high) and may be employed as a proxy for the impedance. In turn, the measured voltage level may be compared with an acceptable range of values to determine whether the measured voltage level (and the corresponding impedance) is within the acceptable range (e.g., the connector 107 is in a normal operating state) or outside the acceptable range (e.g., the connector 107 is in an abnormal operating state). An example implementation of the monitoring circuit 118 and the power control circuit 114 for such a system is shown in FIG. 2A. As shown, the power control circuit 114 comprises a switch 202 and the monitoring circuit 118 comprises a voltage detector 204 coupled to the supply terminal of the connector 107 and a current source 206 coupled between a supply voltage (VB) and the supply terminal of the connector 107.

In FIG. 2A, the controller 113 may be communicatively coupled to and control the operation of the voltage detector 204 and/or the current source 206 to monitor an operating state of the connector 107. In some embodiments, the controller 113 may detect a connection to the first device 102 based on a voltage level on one or more of the communication terminals in the connector 107 and, responsive to detecting the connection, apply a current (IB) to the supply terminal of the connector 107 via the current source 206 while the supply terminal is floating (e.g., switch 202 is open). While the current is applied to the supply terminal of the connector 107, the controller 113 may control the voltage detector 204 to measure a voltage level on the supply terminal of the connector 107. Given that the voltage level on the supply terminal of the connector 107 is positively correlated with the impedance between the supply terminal and at least one other terminal of the connector 107, the controller 113 may compare the measured voltage level on the supply terminal with an acceptable range (e.g., one or more thresholds) to determine whether the connector 107 is in a normal operating state or an abnormal operating state.

Figure 2B:
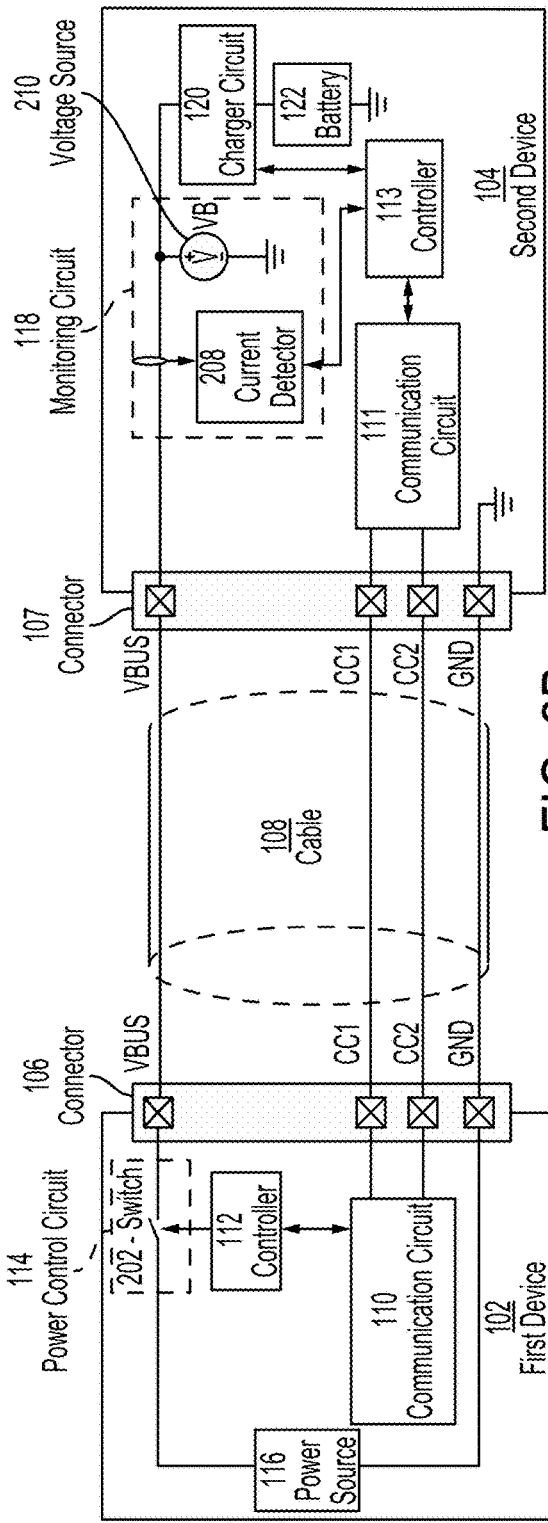

It should be appreciated that various alterations may be made to the system shown in FIG. 2A without departing from the scope of the present disclosure. In some embodiments, the second device 104 may be constructed to apply a voltage to the supply terminal (instead of applying a current) and measure a current level on the supply terminal (instead of measuring a voltage level). For example, a known voltage may be applied to the terminal while the terminal is floating and a current level on the terminal may be measured while the known voltage is applied to the terminal. In this example, the impedance between the supply terminal and at least one other terminal of the connector 107 may be calculated by dividing the known voltage level on the terminal by the measured current level on the terminal. Thus, the measured current level is negatively correlated to the impedance (e.g., the impedance is high when the measured current level is low) and may be employed as a proxy for the impedance. In turn, the measured current level may be compared with an acceptable range of values to determine whether the measured current level (and the corresponding impedance) is within the acceptable range (e.g., the connector 107 is in a normal operating state) or outside the acceptable range (e.g., the connector 107 is in an abnormal operating state). An example implementation of such a system is shown in FIG. 2B. As shown, the monitoring circuit 118 comprises a voltage source 210 coupled between a reference potential and the supply terminal of the connector 107 (in place of the current source 206) and a current detector 208 coupled to the supply terminal of the connector 107 (in place of the voltage detector 208).

In FIG. 2B, the controller 113 may be communicatively coupled to and control the operation of the current detector 208 and/or the voltage source 210 to monitor an operating state of the connector 107. In some embodiments, the controller 113 may detect a connection to the first device 102 based on a voltage level on one or more of the communication terminals in the connector 107 and, responsive to detecting the connection, apply a voltage (VB) to the supply terminal of the connector 107 via the voltage source 210 while the supply terminal is floating (e.g., switch 202 is open). While the voltage is applied to the supply terminal of the connector 107, the controller 113 may control the current detector 206 to measure a current level on the supply terminal of the connector 107. Given that the current level on the supply terminal of the connector 107 is correlated (e.g., negatively correlated) with the impedance between the supply terminal and at least one other terminal of the connector 107, the controller may compare the measured current level on the supply terminal with an acceptable range (e.g., one or more thresholds) to determine whether the connector 107 is in a normal operating state or an abnormal operating state.

As mentioned above with reference to FIGS. 2A and 2B, the controller 113 may direct the monitoring circuit 118 to apply an electrical signal (e.g., a current from the current source 206 or a voltage from the voltage source 210) to the supply terminal to the connector 107 while the supply terminal is floating (e.g., the switch 202 is open). In some embodiments, the second device 104 may perform one or more operations prior to applying the electrical signal to the supply terminal of the connector 107 to ensure that the supply terminal is floating. For example, the controller 113 may, in response to detecting a connection to the first device 102, transmit a first message via the communication circuit 111 to the first device 102 (e.g., a stop request to stop power transfer to the second device 104) that triggers the first device 102 to open the switch 202. Thus, the controller 113 may ensure that the switch 202 is open prior to applying the electrical signal to the supply terminal. If the controller 113 determines that the connector 107 is in a normal state, the controller 113 may transmit a at least one control signal (e.g., in a second message) via the communication circuit 111 to the first device 102 (e.g., a start request to provide power to the second device 104) that triggers the first device 102 to close the switch 202. Otherwise, the controller 113 may permit the first device 102 to remain in the same state (e.g., with the switch 202 open).

In some embodiments, the second device 104 may apply the electrical signal to the supply terminal of the connector 107 at an opportune time when the switch 202 is open instead of transmitting messages to the first device 102. For example, the first device 102 may wait a fixed period of time after detecting a connection to the second device 104 before closing the switch 202. Such a period may be, for example, a debounce period to ensure that a solid connection has been established prior to transferring power. The duration of the period may be, for example, less than 50 milliseconds (ms) (e.g., 10 ms, 20 ms, 30 ms, 40 ms, etc.). In this example, the controller 113 may apply the electrical signal and determine whether the connector 107 is in a normal state during this period (e.g., the debounce period). If the controller 113 determines that the connector 107 is in an abnormal state, the controller 113 may transmit a message via the communication circuit 111 to the first device 102 (e.g., a stop request to stop providing power to the second device 104) that triggers the first device 102 to keep the switch 202 open. Otherwise, the controller 113 may permit the first device 102 to close the switch 202 and initiate power transfer uninterrupted.

Figure 3A:
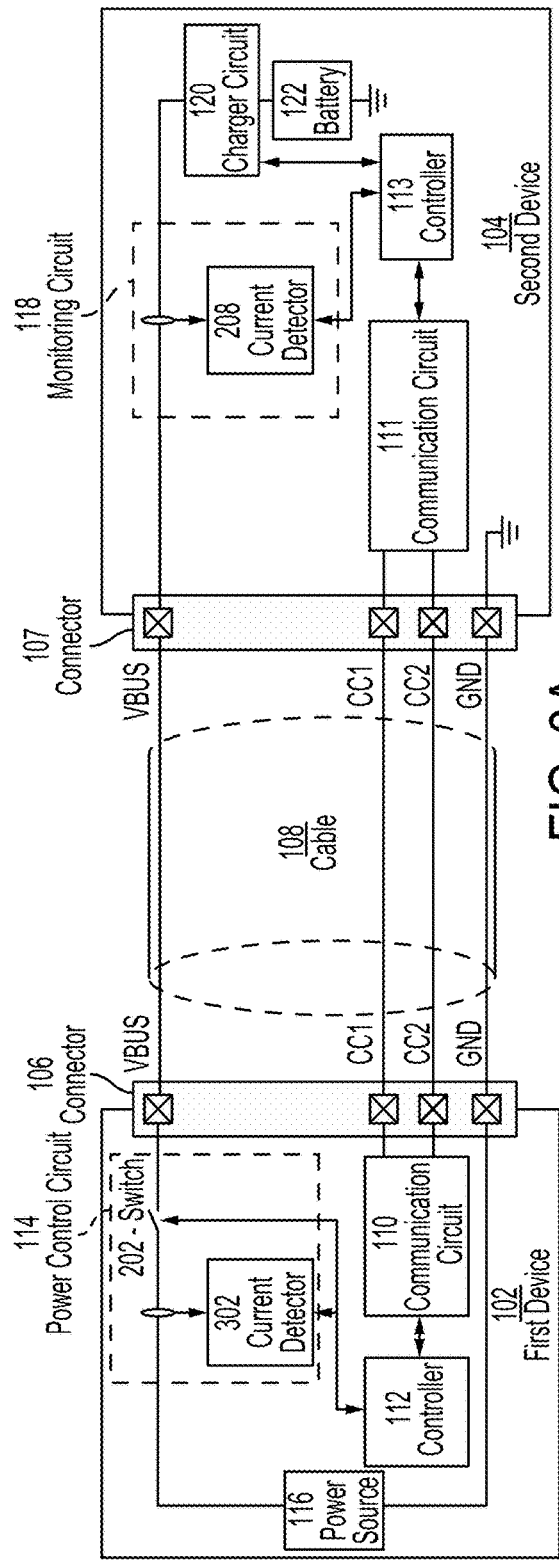
FIGS. 3A and 3B each shows an example implementation of the system shown in FIG. 1 configured to monitor an operating status of a connector, according to some embodiments.

In some embodiments, the second device 104 may be configured to monitor a state of the connector 106 without applying an electrical signal to the supply terminal of the connector 106. In these embodiments, the current level on the supply terminal on each of the connectors 106 and 107 may be compared to determine whether the connector 107 is operating in a normal state or an abnormal state. During normal operation, the current level detected on the supply terminal of the connector 106 should be approximately equal to (or exactly equal to) the current level on the supply terminal of the connector 107. If the current level on the supply terminal of the connector 106 deviates from the current level on the supply terminal of the connector 107 by a threshold value, there is likely some leakage current from the supply terminal of the connector 107 and the connector 107 is operating in an abnormal state. FIG. 3A shows an example implementation of such a system. Relative to the implementation shown in FIG. 2B, a current detector 304 is added to the power control circuit 114 to measure a current level on the supply terminal of the connector 106 in the first device 102 and the voltage source 210 in the monitoring circuit 118 is removed.

In FIG. 3A, the controller 113 may be communicatively coupled to and control the operation of the current detector 208 to monitor an operating state of the connector 107. In some embodiments, the controller 113 may detect a connection to the first device 102 based on a voltage level on one or more of the communication terminals in the connector 107 and, responsive to detecting the connection, measure a current level on the supply terminal of the connector 107 via the current detector 208 while the first device 102 is providing power to the second device (e.g., switch 202 is closed). In addition, the controller 113 may transmit a current level request to the first device 102 via the communication circuit 111 to trigger the first device 102 to respond to the request with an indication of the current level on the supply terminal of the connector 106. For example, the controller 112 of the first device 102 may detect receipt of the current level request and, in response to receiving the current level request, measure the current level on the supply terminal of the connector 106 via the current detector 302 and transmit the measured current level to the second device 104. Once the controller 113 receives the current level on the supply terminal of the connector 106 from the first device 102 via the communication circuit 111, the controller 113 may compute a difference between the current level on the supply terminal of the connector 106 with the current level on the supply terminal of the connector 107 and compare the determined difference with a threshold. If the current level on the supply terminal of the connector 106 deviates from the current level on the supply terminal of the connector 107 by more than a threshold amount, the connector 107 is in an abnormal state and power transfer from the first device 102 to the second device 104 is stopped (e.g., by the controller 113 transmitting a stop request to the first device 102 via the communication circuit 111). Otherwise, the connector 107 is in a normal state and power transfer from the first device 102 to the second device 104 may continue uninterrupted.

Figure 3B:
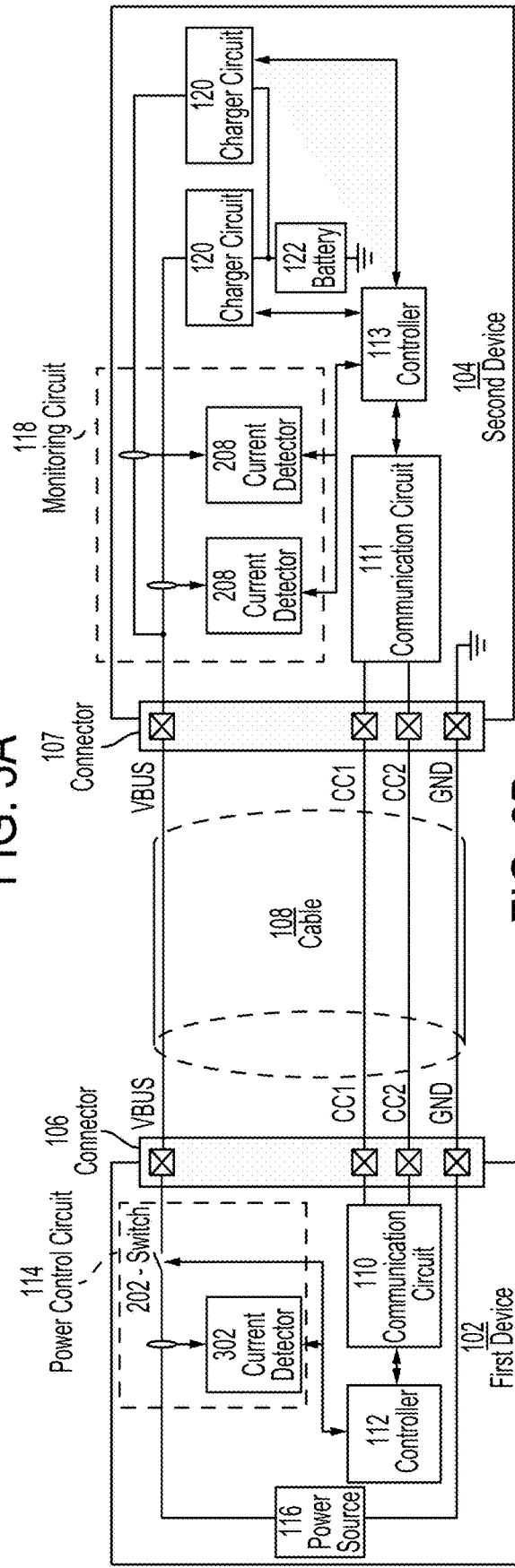

It should be appreciated that various alterations may be made to the monitoring circuit 118 in FIG. 3A without departing from the scope of the present disclosure. For example, the second device 104 may comprise a plurality of charger circuits 120 and the monitoring circuit 118 may comprise a current detector 208 for each of the plurality of charger circuits 120. Thus, the controller 113 may be able to determine the total current received via the supply terminal of the connector 107 (e.g., by adding the detected current from each of the current detectors 208). An example of such a system is shown in FIG. 3B. As shown, the second device 104 comprises two charger circuits 120 and the monitoring circuit 118 comprises two current detectors 208 (one current detector 208 for each charger circuit).

Figure 4A:
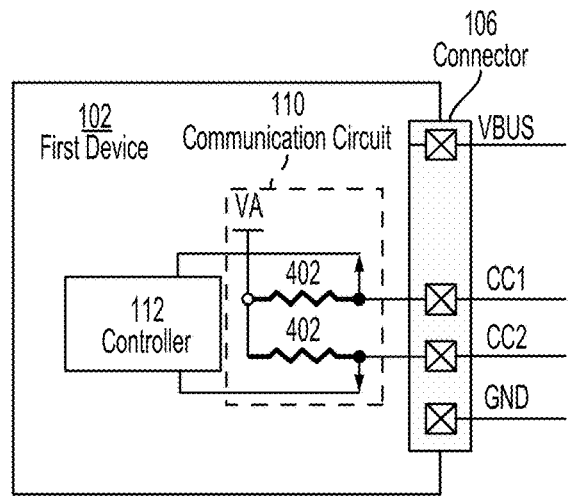
FIGS. 4A, 4B, and 4C each shows a detailed diagram of an example communication circuit, according to some embodiments.

As discussed above, the first device 102 may comprise the communication circuit 110 that enables communication with the second device 104 (e.g., via the communication terminal(s) in the connector 106). FIG. 4A shows an example implementation of the communication circuit 110. As shown, the communication circuit 110 comprises a plurality of resistances 402 each coupled between a supply voltage (VA) and one communication terminal in the connector 106. The resistances 402 may be, for example, pull-up resistances that keep the voltage on the communication terminals of the connector 106 high (e.g., in the absence of a connection to a reference or other voltage level). Thus, data may be transmitted by selectively coupling the communication terminal to ground to cause a voltage drop on the communication terminal. Accordingly, the controller 112 may monitor a voltage level on the communication terminals to, for example, detect data transmission and/or detect the connection of another device to the first device 102.

Figure 4B:
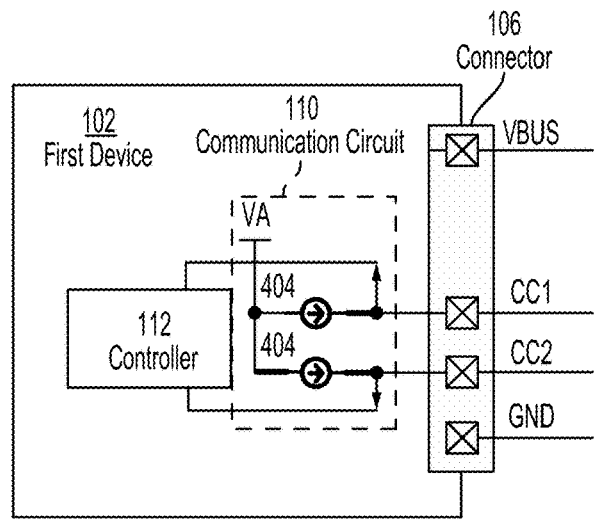

It should be appreciated that the communication circuit 110 may be implemented in ways separate and apart from the particular implementation in FIG. 4A. For example, the resistances 402 may be replaced with current sources 404 as shown in FIG. 4B. In this example, the data may be transmitted by selectively coupling the communication terminal to ground (e.g., via a resistance) to cause a voltage drop on the communication terminal. Accordingly, the controller 112 may monitor a voltage level on the communication terminals to, for example, detect data transmission and/or detect the connection of another device to the first device 102.

Figure 4C:
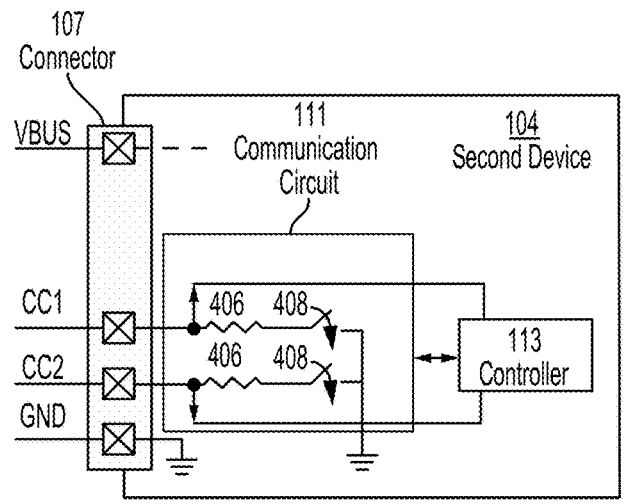

FIG. 4C shows an example communication circuit 111 for the second device 111 that may be capable of enabling communication with the communication circuits 110 shown in FIGS. 4A and 4B. As shown, the communication circuit 111 comprises a plurality of resistances 406 each coupled to one communication terminal in the connector 107 and to a reference potential (e.g., ground) by a switch 408. In this implementation, data may be transmitted by selectively closing the switches 408 to cause a voltage drop on the communication terminals in the connector 107. Similarly, data may be received (and/or connections to the second device 104 identified) by monitoring the voltage on the communication terminals.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

The terms "approximately," "about," and "substantially" may be used to mean within ±4% of a target value in some embodiments. The terms "approximately," "about," and "substantially" may include the target value. It should be appreciated that the terms "approximately," "about," and "substantially" may be used to refer to a range smaller than ±4% of a target value such as: ±2% of a target value, ±1% of a target value, ±0.4% of a target value, ±0.2% of a target value, and ±0.1% of a target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A device comprising:
    a connector configured to electrically couple to an external device and comprising a plurality of terminals including a supply terminal;
    a monitoring circuit coupled to the supply terminal and configured to apply an electrical signal to the supply terminal and measure at least one of a voltage level and a current level on the supply terminal;
    a controller communicatively coupled to the monitoring circuit and configured to:
    apply, via the monitoring circuit, the electrical signal to the supply terminal;
    identify, via the monitoring circuit, the at least one of the voltage level and the current level on the supply terminal while the electrical signal is applied to the supply terminal;
    determine whether an impedance between the supply terminal and at least one other terminal in the plurality of terminals is above a threshold using the at least one of the voltage level and the current level on the supply terminal; and output at least one first message responsive to the impedance being below the threshold.

2. The device of claim 1, further comprising:
a battery; and
a charger circuit coupled between the supply terminal and the battery and configured to selectively charge the battery using at least some power from the supply terminal.

3. The device of claim 2, wherein the controller is configured to control the charging circuit to charge the battery using the at least some power from the supply terminal responsive to the impedance being above the threshold.

4. The device of claim 1, wherein the controller is configured to determine whether the impedance is above the threshold at least in part by determining whether the at least one of the voltage level and the current level on the supply terminal is within a range of acceptable values.

5. The device of claim 1, wherein the controller is configured to apply the electrical signal to the supply terminal and identify the at least one of the voltage level and the current level on the supply terminal while the external device is not providing power to the supply terminal.

6. The device of claim 5, wherein the controller is configured to, before applying the electrical signal to the supply terminal, transmit at least one control signal to the external device to stop providing power to the supply terminal responsive to detecting the connection to the external device.

7. The device of claim 5, wherein the controller is configured to apply the electrical signal to the supply terminal and identify the at least one of the voltage level and the current level on the supply terminal during a debounce period where the external device is not providing power to the supply terminal after the connector is electrically coupled to the external device.

8. The device of claim 1, wherein the monitoring circuit is configured to apply the electrical signal to the supply terminal and measure the at least one of the voltage level and the current level on the supply terminal at least in part by applying a voltage to the supply terminal and measuring the current level on the supply terminal.

9. The device of claim 8, wherein the monitoring circuit comprises a voltage source coupled to the supply terminal and a current detector coupled to the supply terminal and the voltage source.

10. The device of claim 1, wherein the monitoring circuit is configured to apply the electrical signal to the supply terminal and measure the at least one of the voltage level and the current level on the supply terminal at least in part by applying a current to the supply terminal and measuring the voltage level on the supply terminal.

11. The device of claim 10, wherein the monitoring circuit comprises a current source coupled to the supply terminal and a voltage detector coupled to the supply terminal and the voltage source.

12. The device of claim 1, wherein the connector comprises a communication terminal coupled to the communication circuit, the communication circuit is configured to communicate with the external device via the communication terminal, and the controller is configured to detect, via the communication circuit, a connection to the external device and apply the electrical signal to the supply terminal responsive to detecting the connection to the external device.

13. The device of claim 12, wherein the communication circuit comprises a resistance coupled between the communication terminal and a reference potential and wherein the controller is configured to detect the connection to the external device based on a voltage level on the communication terminal.

14. A device comprising:
a connector configured to electrically couple to an external device and comprising a plurality of terminals including a supply terminal;
a communication circuit configured to communicate with the external device;
a monitoring circuit coupled to the supply terminal and configured to measure a current level on the supply terminal;
a controller communicatively coupled to the communication circuit and the monitoring circuit, the controller being configured to:
identify, via the monitoring circuit, the current level on the supply terminal;
obtain, via the communication circuit, a current level output by the external device;
determine whether an impedance between the supply terminal and at least one other terminal in the plurality of terminals is above a threshold using the current level on the supply terminal and the current level output by the external device; and
output at least one message responsive to the impedance being below the threshold.

15. The device of claim 14, further comprising:
a battery; and
a charger circuit coupled between the supply terminal and the battery and configured to selectively charge the battery using at least some power from the supply terminal.

16. The device of claim 15, wherein the controller is configured to control the charging circuit to charge the battery using the at least some power from the supply terminal responsive to the impedance being above the threshold.

17. The device of claim 14, wherein the controller is configured to determine whether the impedance is above the threshold at least in part by determining whether a difference between the current level on the supply terminal and the current level output by the external device is below a threshold value.

18. The device of claim 14, wherein the controller is configured identify the current level on the supply terminal and obtain a current level output by the external device while the external device is providing power to the supply terminal.

19. The device of claim 18, wherein the controller is configured to output the at least one message at least in part by transmitting a message to the external device to stop providing power to the supply terminal.

20. The device of claim 14, wherein the connector comprises a communication terminal coupled to the communication circuit, the communication circuit is configured to communicate with the external device via the communication terminal, and the controller is configured to detect, via the communication circuit, a connection to the external device and identify the current level on the supply terminal responsive to detecting the connection to the external device.

21. The device of claim 20, wherein the communication circuit comprises a resistance coupled between the communication terminal and a reference potential and wherein the controller is configured to detect the connection to the external device based on a voltage level on the communication terminal.

22. A device comprising:
- a connector configured to electrically couple to an external device and comprising a plurality of terminals including a supply terminal and a communication terminal;
- a communication circuit coupled to the communication terminal and configured to communicate with the external device via the communication terminal;
- a power source configured to provide output power;

a power control circuit coupled between the power source and the supply terminal and configured to selectively couple the power source to the supply terminal and measure a current level on the supply terminal;
- a controller coupled to the communication circuit and the power control circuit, the controller being configured to:
  - detect, via the communication circuit, a connection to the external device;
  - couple, via the power control circuit, the power source to the supply terminal responsive to detecting the connection to the external device;
  - receive, via the communication circuit, a current level request from the external device; and
  - responsive to receiving the current level request,
  - identify, via the power control circuit, the current level on the supply terminal; and
  - transmit, via the communication circuit, the current level on the supply terminal to the external device.

23. The device of claim 22, wherein the communication circuit comprises at least one of a current source and an impedance coupled to the communication terminal and wherein the controller is configured to detect the connection to the external device based on a voltage level on the communication terminal.

24. The device of claim 22, wherein the controller is configured to receive a stop request to stop providing power to the supply terminal from the external device and, responsive to receipt of the stop request, control the power control circuit to decouple the power source from the supply terminal.

25. A system comprising:
- a first device including a first connector configured to electrically couple to a second device and comprising a first supply terminal, a first communication circuit configured to communicate with the second device, a circuit coupled to the first supply terminal and configured to measure a current level on the first supply terminal, and a first controller coupled to the circuit and the first communication circuit, the first controller being configured to receive, via the first communication circuit, a current level request from the second device, and responsive to receiving the current level request, identify, via the circuit, the current level on the first supply terminal and transmit, via the communication circuit, the current level on the first supply terminal to the second device; and
- the second device including a second connector configured to electrically couple to the first device and comprising a second supply terminal, a second communication circuit configured to communicate with the first device, a monitoring circuit coupled to the second supply terminal and configured to measure a current level on the second supply terminal, a second controller communicatively coupled to the second communication circuit and the monitoring circuit, the second controller being configured to identify, via the monitoring circuit, the current level on the second supply terminal, obtain, via the second communication circuit, the current level on the first supply terminal from the first device, determine whether an impedance between the supply terminal and at least one other terminal in the plurality of terminals is above a threshold using the current level on the first supply terminal and the current level on the second supply terminal, and output at least one message responsive to the impedance being below the threshold.

\* \* \* \* \*

UNITED STATES PATENT AND TRADEMARK OFFICE
CERTIFICATE OF CORRECTION

PATENT NO. : 10,554,058 B2
APPLICATION NO. : 16/024538
DATED : February 4, 2020
INVENTOR(S) : Chih-Yuan Hsu et al.

Page 1 of 1

It is certified that error appears in the above-identified patent and that said Letters Patent is hereby corrected as shown below:

On the Title Page

Item (73) should read:
Assignee: MediaTek Inc., Hsin-Chu (TW)

Signed and Sealed this
Twentieth Day of October, 2020

Andrei Iancu
*Director of the United States Patent and Trademark Office*